United States Patent [19]

Fischer et al.

[11] 4,088,190
[45] May 9, 1978

[54] CARBON DIOXIDE FOAM FLOODING

[75] Inventors: Paul W. Fischer, Whittier; LeRoy W. Holm, Fullerton; David S. Pye, Brea, all of Calif.

[73] Assignee: Union Oil Company of California, Brea, Calif.

[21] Appl. No.: 767,529

[22] Filed: Feb. 10, 1977

[51] Int. Cl.² ............................................. E21B 43/22
[52] U.S. Cl. .................. 166/274; 166/305 R
[58] Field of Search .......... 166/273, 274, 309, 305 R; 175/69, 71; 252/8.55 D, 8.5 C

[56] References Cited

U.S. PATENT DOCUMENTS

| | | | |
|---|---|---|---|
| 3,311,167 | 3/1967 | O'Brien et al. | 166/273 X |
| 3,330,346 | 7/1967 | Jacobs et al. | 166/273 |
| 3,342,256 | 9/1967 | Bernard et al. | 166/273 |
| 3,344,857 | 10/1967 | Gilchrist | 166/273 |
| 3,376,924 | 4/1968 | Felsenthal et al. | 166/273 X |
| 3,893,511 | 7/1975 | Root | 166/274 X |
| 4,036,764 | 7/1977 | Fischer et al. | 252/8.5 C |

OTHER PUBLICATIONS

Khan et al., "Foam Proves Effective Way to Solve Production Problems", The Oil & Gas Journal, Jun. 5, 1967, pp. 126–129.

*Primary Examiner*—Stephen J. Novosad
*Attorney, Agent, or Firm*—Richard C. Hartman; Dean Sandford; Gerald L. Floyd

[57] ABSTRACT

A method of conducting an enhanced oil recovery process in a subterranean reservoir wherein, as part of the process, there is injected into the reservoir as a sweep fluid a foam containing carbon dioxide, water and a foaming agent having the formula:

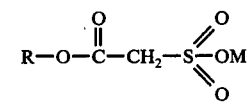

wherein R is a straight chain alkyl radical having from 10 to 16 carbon atoms; and M is an alkali metal or ammonium cation, with sodium being preferred. A particularly preferred foaming agent is sodium lauryl sulfoacetate.

14 Claims, No Drawings

CARBON DIOXIDE FOAM FLOODING

BACKGROUND OF THE INVENTION

1. Field of the Invention

This invention relates to a method of enhanced oil recovery utilizing a foamed carbon dioxide sweep fluid. More particularly the invention relates to such a method utilizing a foam having improved stability.

2. Description of the Prior Art

Methods of enhanced oil recovery involving injection of carbon dioxide at high pressures into a reservoir via an injection well while withdrawing reservoir fluids via a production well are well known in the art. Such a process is described by Whorton et al. in U.S. Pat. No. 2,623,596. later it was discovered that recovery of petroleum could be increased in such processes if the carbon dioxide was used in slug form and driven through the reservoir by an aqueous drive fluid such as brine, plain or carbonated water. A typical process of this type is described by Holm in U.S. Pat. No. 3,065,790. Next, it was discovered that the areal sweep efficiency and the overall efficiency of the carbon dioxide-waterflood enhanced oil recovery process could be improved by incorporating a foaming agent and water into the slug of carbon dioxide to form a foam. U.S. Pat. No. 3,342,256 to Bernard et al. describes such a process utilizing a wide variety of foaming agents including water-soluble salts of esters of $C_3$–$C_6$ dicarboxylic acids, such as monosodium dioctyl sulfosuccinate and the like.

In U.S. patent application Ser. No. 621,685, filed Oct. 14, 1975 by Fischer et al., now U.S. Pat. No 4,036,764, there is described a method of drilling and workover in a high temperature well employing as the drilling or workover fluid a foam containing a gas, such as air, carbon dioxide or the like and an aqueous solution of a foaming agent having the formula:

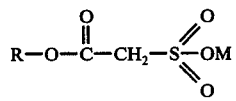

wherein R is a straight chain alkyl radical having from 10 to 16 carbon atoms, and M is an alkali metal or ammonium cation, with sodium being preferred. A particularly preferred foaming agent is sodium lauryl sulfoacetate.

It has been the experience that in spite of the wide variety of foaming agents known for foaming aqueous base media, the foaming of a mixture of carbon dioxide and water for use as a sweep fluid in an enhanced oil recovery process presents many problems. The mixture of carbon dioxide and water to be foamed constitutes an acidic composition. Many foaming agents are not stable in acidic media and tend to decompose. Due to the length of time required to carry out an enhanced oil recovery process, it is necessary that the foamed carbon dioxide remain in the foamed state for a prolonged period of time while passing through a reservoir which often has an elevated temperature. Many foaming agents satisfactorily foam carbon dioxide initially, but the foam tends to break down after a brief period of time, such as a day or two. Other foaming agents are capable of foaming carbon dioxide at atmospheric or relatively low pressure but fail to form satisfactory foams under the high pressure conditions at which enhanced oil recovery processes are often carried out. At low pressures, carbon dioxide tends to behave as a gas. At high pressures, carbon dioxide becomes a viscous fluid and takes on many of the characteristics of a liquid. Some foaming agents must be present in a relatively high concentration to foam carbon dioxide. Due to the large volume of injected fluids required in the instant process, it is desired to keep the concentration of foaming agent in the foam to a minimum. Thus, there is a need for an enhanced oil recovery process which employs a carbon dioxide foam which is stable at the conditions under which the process is carried out.

Accordingly, a principal object of this invention is to provide a method of enhanced oil recovery using an aqueous base carbon dioxide foam as a sweep fluid.

A further object of this invention is to provide such a method conducted in a high temperature reservoir.

A still further object of this invention is to provide such a method utilizing a foaming agent which foams carbon dioxide at high pressure.

Another object of this invention is to provide such a method utilizing a carbon dioxide foam which is stable over a long period of time at elevated pressure.

Other objects, advantages and features of this invention will become apparent to those skilled in the art from the following discussion and appended claims.

SUMMARY OF THE INVENTION

Briefly, this invention involves a method of conducting an enhanced oil recovery process in a subterranean reservoir wherein there is injeced into the reservoir via an injection well as a sweep or displacement fluid a mixture of carbon dioxide at high pressure, water, and, as a foaming agent, an alkali metal or ammonium salt of an alkyl sulfoacetate wherein the alkyl radical is straight chained and has from 10 to 16 carbon atoms. The sweep fluid can be followed by a drive fluid to push the sweep fluid through the reservoir towards a production well through which reservoir fluids are produced.

DETAILED DESCRIPTION OF THE INVENTION

In enhanced oil recovery processes, a sweep or displacement fluid is injected into a hydrocarbon-bearing resevoir via an injection well to displace reservoir hydrocarbons through the reservoir towards a production well through which they are produced. The sweep fluid may constitute the entire body of enhanced oil recovery fluid or a slug of sweep fluid can be followed by a drive fluid, such as thickened or unthickened plain or carbonated water or brine or a gas such as air, carbon dioxide, combustion gases or hydrocarbon gases. In the instant invention, the sweep fluid is a foam containing carbon dioxide, water and an alkali metal or ammonium salt of an alkyl sulfoacetate as a foaming agent. The foam has good stability under pressures of the magnitude commonly encountered in subterranean reservoirs. The stability is even greater at elevated pressures than it is at lower pressures.

The foam may be formed in any one of a number of ways. The foam may be generated at the surface by combining the ingredients in a suitable mixing device, such as a foam generator. The foam is then injected into the reservoir. More commonly the foam is generated in situ by injecting via the injection well the ingredients of the foam either separately or simultaneously. Alternatively, two or more of the components can be mixed together at the surface prior to introduction into the well. In these instances, the foam forms during its passage down the well and in the reservoir in the vicinity of the well. When the components are injected separately, the foaming agent and water should be introduced before or at the same time as the carbon dioxide.

It must be noted that the enhanced oil recovery processes described above in which carbon dioxide is used as a sweep fluid employ the carbon dioxide at pressures in excess of about 700 p.s.i. It is well known that the solubility characteristics of carbon dioxide have a distinct effect on oil recoveries when the carbon dioxide is at pressures in excess of about 700 p.s.i. At these high pressures, carbon dioxide exists as a dense fluid or liquid, rather than as a gas, even though the critical temperature of carbon dioxide is about 89° F. That is to say, carbon dioxide has not been liquefied at temperatures above 89° F., regardless of the pressures applied. However, below 89° F., carbon dioxide exists either as a gas, a dense fluid or a liquid, depending upon pressures applied. Inasmuch as the typical pressures employed in enhanced oil recovery processes when carbon dioxide is used are in excess of 700 p.s.i., and the temperatures are below about 200° F., the carbon dioxide exists as a dense fluid, rather than as a gas, and, in most typical situations where the reservoir temperature is below 89° the carbon dioxide exists as a liquid. A dense fluid is more like a liquid than a gas, as evidenced by considering solubility factors. For instance, a foaming agent will readily dissolve in carbon dioxide when the carbon dioxide exists as a dense fluid, whereas it will not dissolve in the carbon dioxide when the carbon dioxide exists in the gaseous state.

The amount of the carbon dioxide injected into the reservoir will of course vary for different reservoirs, and will be dependent upon total reservoir pore volume, hydrocarbon pore volume, and other unique reservoir characteristics. However, throughout this description and claims the term "effective pore volume" is to be taken to mean that portion of the reservoir which is expected to be contacted by the carbon dioxide injected. "Effective pore volume" is determined by conventional laboratory and field techniques, well known to petroleum engineers.

In carrying out the process of this invention, about 0.01 to 0.2 effective pore volume of foam containing about 88 to 98.9 volume percent carbon dioxide measured at reservoir conditions of temperature and pressure, about 1 to 10 volume percent water and about 0.1 to 2 volume percent foaming agent, is injected through an injection well and into the reservoir. Depending upon the reservoir temperature and the pressure utilized, the carbon dioxide will exist either as a liquid or as a dense fluid. The carbon dioxide is preferably injected into the reservoir as a liquid and under sufficient pressure to maintain it in the reservoir as either a dense fluid or a liquid. The subsequently injected drive medium is injected in an amount sufficient to drive the carbon dioxide through the reservoir from the injection to a production well. Injection of the driving fluid is continued until the liquids produced in the production well have a high water/oil ratio, at which time injection of drive fluid is terminated. Subsequent to the termination of driving fluid injection, the reservoir is depressured to allow the dissolved gases to come out of solution and thereby to form additional foam to drive additional oil towards the production well.

In another embodiment of this process, the foaming agent may be injected into the reservoir prior to injection of the carbon dioxide slug. For instance, the foaming agent may be incorporated into a liquid such as water, mineral oil, or those hydrocarbons which are normally liquid at pressures in excess of about 700 p.s.i., such as LPG, propane, etc. In this instance, since the water or hydrocarbon acts as a carrier vehicle for the foaming agent, it is necessary that the foaming agent be soluble in the vehicle in which it is to be incorporated. Where the foaming agent is incorporated in a liquefied light hydrocarbon and is introduced into the reservoir ahead of the carbon dioxide slug, the presence of cracks and fissures, etc., wherein very high pressure gradients exist, will cause the liquefied light hydrocarbon to flash to a gas thereby generating foam at these areas of very high permeability. When the foaming agent is incorporated in a water vehicle, the water may contain carbon dioxide or other dissolved gases in amounts sufficient to cause them to come out of solution and generate foam when an area of low pressure is encountered. When the foaming agent is introduced into the reservoir prior to injection of the carbon dioxide slug, it is readily apparent that the subsequently injected carbon dioxide will not channel through highly permeable strata inasmuch as the foam will retard such channeling. Not only does formation of foam at the highly permeable strata, streaks or fissures retard loss of carbon dioxide from the zone of interest, but any foam increases its viscosity, thereby making the carbon dioxide a much more efficient displacing fluid. While the foaming agent-containing solution may have incorporated in it dissolved gas which will come out of solution, it is also possible to inject an aqueous or non-aqueous foaming agent-containing solution and follow it with gases such as carbon dioxide, methane, etc. When this mode is utilized, foam will be formed within the immediate vicinity of the injection well and will preferentially be driven into the more highly permeable strata rather than the less permeable strata, the solution taking the path of least resistance. The carbon dioxide then injected will more readily penetrate the less permeable strata because of the plugging effect created by the foam in the highly permeable strata.

The foaming agent employed in the process of this invention, which is capable of producing a stable form under reservoir conditions when intimately contacted with water and carbon dioxide, is an alkali metal or ammonium salt of a carboalkoxy methane sulfonic acid, werein the alkyl radical is straight chained and has from 10 to 16 carbon atoms, and is characterized by the following generalized formula:

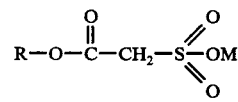

wherein R is the alkyl radical; and M is the alkali metal or ammonium cation, with the sodium cation being preferred. Specifically, the alkyl radical can be n-decyl, n-undecyl, n-dodecyl, n-tridecyl, n-tetradecyl, n-pentadecyl, or n-hexadecyl. A particularly preferred foaming agent is sodium lauryl sulfoacetate, which has the formula described above wherein R is a n-dodecyl radical and M is a sodium cation, and which is marketed by Stepan Chemical Company under the trademark Lathanol LAL 70 which is 70 percent active.

The water used in the foam is preferably fresh water or brine containing less than about 3 percent by weight salt content. If brine containing a higher concentration of salts is employed, the foam is difficult to form and the foam that does form has decreased stability.

In one embodiment of this invention, an aqueous foaming agent solution is prepared by admixing the foaming agent in a carrier such as water, such that the solution contains about 0.20 to 10 weight percent of the foaming agent, preferably about 0.5 to 2 weight percent, and more preferably about 1 weight percent of the foaming agent.

The invention is further described by the following examples which are illustrative of prior art methods and specific modes of practicing the invention and are not intended as limiting the scope of the invention as defined by the appended claims.

EXAMPLES 1–10

To illustrate the persistence of foam in oil-bearing reservoirs, laboratory tests are made to determine the stability at elevated pressure of foam produced from carbon dioxide, water and various foaming agents in the presence of oil. In a Jurguson windowed high pressure gauge having a volume of 90 milliliters (mls.), there are mixed 21 mls. synthetic tap water containing 300 parts per million (p.p.m.) sodium chloride, 170 p.p.m. calcium chloride and 30 p.p.m. magnesium chloride, 1.3 mls. Kansas crude oil and 2,000 p.p.m. by volume foaming agent. The air space in the gauge is purged with carbon dioxide. Additional carbon dioxide is introduced to raise the pressure of the system to various values. The cell is then shaken vigorously by hand for 15 seconds to form a foam. The specific volume of the foam and the length of time the foam persists before breaking completely, i.e., the foam stability, are observed. The results of these tests are shown in the Table. These results show that while both foaming agents tested form a satisfactory foam under these conditions, the stability of the foams made using the foaming agent of this invention, Examples 1–5, is far greater than the stability of the foams made using an alkyl aryl polyether alcohol, a well known foaming agent, Examples 6–10. Also, the stability of the foam made using the foaming agent of this invention appears to increase dramatically with increasing pressure whereas that of the foam made using the well known foaming agent decreases with increasing pressure.

TABLE
FORMATION AND STABILITY OF CARBON DIOXIDE FOAM UNDER PRESSURE

| Example | Pressure (p.s.i.g.) | Foaming Agent (2,000 p.p.m.) | Specific Volume of Foam (mls./gram) | Foam Stability (seconds) |
|---|---|---|---|---|
| 1 | 925 | Lathanol LAL 70* | 5.7 | 92 |
| 2 | 1,135 | " | 3.4 | 308 |
| 3 | 1,285 | " | 1.9 | 1,267 |
| 4 | 1,630 | " | 1.4 | 1,800 |
| 5 | 2,015 | " | 1.3 | 2,100 |
| 6 | 900 | Triton X-100** | 6.1 | 20 |
| 7 | 1,125 | " | 3.2 | 26 |
| 8 | 1,325 | " | 1.7 | 40 |
| 9 | 1,590 | " | 1.4 | 19 |
| 10 | 1,975 | " | 1.3 | 4 |

*Lathanol LAL 70 foaming agent is sodium lauryl sulfoacetate, 70 percent active, in flake form marketed by Stepan Chemical Company.
**Triton X-100 foaming agent is an alkyl aryl polyether alcohol, octylphenoxy polyethoxy ethanol marketed by Rohm and Hass Co.

EXAMPLE 11

As a specific example of one of the embodiments of the process of this invention, a foam flooding process is carried out in a five-spot well pattern in which the central well is an injection well. The five-spot pattern is in an oil-containing reservoir having a temperature of 135° F. and a pressure of 2,000 p.s.i.g. An aqueous foaming agent solution is prepared at the surface by mixing together 99 parts by weight fresh water and 1 part by weight Lathanol LAL 70, sodium lauryl sulfoacetate, foaming agent. Since the foaming agent is 70 percent active, the aqueous foaming agent solution contains 0.7 percent by weight active foaming agent. The aqueous foaming agent solution is injected into the reservoir via the injection well at the rate of 100 barrels per day until a volume equal to 1 percent of the effective pore volume of the reservoir has been injected. Next, 150 barrels per day of carbon dioxide is injected until a volume equal to 10 percent of the effective pore volume of the reservoir has been injected. The injected carbon dioxide is a liquid at the surface but becomes a critical fluid in the reservoir. As the carbon dioxide is injected, a substantial back pressure is produced which indicates the in situ generation of a foam bank in the reservoir. The injection of carbon dioxide is followed by water as a drive fluid to drive the oil and injected fluids toward the four production wells. Injection of the drive fluid and production of oil via the production wells are continued until the produced water/oil ratio reaches an uneconomical level.

Various embodiments and modifications of this invention have been described in the foregoing specification, and further modifications will become apparent to those skilled in the art. Such modifications are included within the scope of this invention as defined by the following claims.

Having now described our invention, we claim:

1. In the recovery of oil from a subterranean oil-bearing reservoir wherein a water based foamed carbon dioxide is introduced into the reservoir and then driven through said reservoir from an injection well toward a production well by means of a drive fluid, the improvement which comprises employing in said foamed carbon dioxide a foaming agent having the formula:

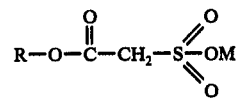

wherein R is a straight chain alkyl radical having from 10 to 16 carbon atoms; and M is an alkali metal or ammonium cation.

2. The method defined in claim 1 wherein R is an n-dodecyl radical.

3. The method defined in claim 1 wherein said foaming agent is sodium lauryl sulfoacetate.

4. The method defined in claim 1 wherein the foaming agent is employed in the foam at a concentration of about 0.1 to 2 volume percent.

5. The method defined in claim 1 wherein said water contains less than 3 percent by weight salt.

6. The method defined in claim 1 wherein the reservoir pressure is at least 700 p.s.i.g.

7. A method of enhanced oil recovery comprising passing through an oil-containing subterranean reservoir as a sweep fluid from 0.01 to 0.2 effective pore volumes of a foam comprising from about 88 to 98.9 volume percent carbon dioxide, about 1 to 10 volume percent water and about 0.1 to 2 volume percent foaming agent having the formula:

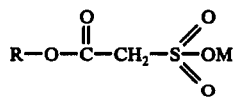

wherein R is a straight chain alkyl radical having from 10 to 16 carbon atoms; and M is an alkali metal or ammonium cation.

8. The method defined in claim 7 wherein the foam is formed by simultaneously injecting the carbon dioxide, water and foaming agent into an injection well penetrating said reservoir.

9. The method defined in claim 8 wherein the water and foaming agent are mixed prior to injection.

10. The method defined in claim 7 wherein the foam is formed by injecting a water solution of the foaming agent followed by the carbon dioxide into an injection well penetrating said reservoir.

11. The method defined in claim 7 wherein the foam is formed by injecting small volume alternate slugs of a water solution of the foaming agent and carbon dioxide.

12. The method defined in claim 7 wherein the reservoir pressure is at least 700 p.s.i.g.

13. The method defined in claim 7 wherein R is an n-dodecyl radical.

14. The method defined in claim 7 wherein said foaming agent is sodium lauryl sulfoacetate.

* * * * *